July 14, 1953  W. A. CHAMBERLAIN ET AL  2,645,130
TORQUE CONVERTER
Filed June 21, 1950  3 Sheets--Sheet 1
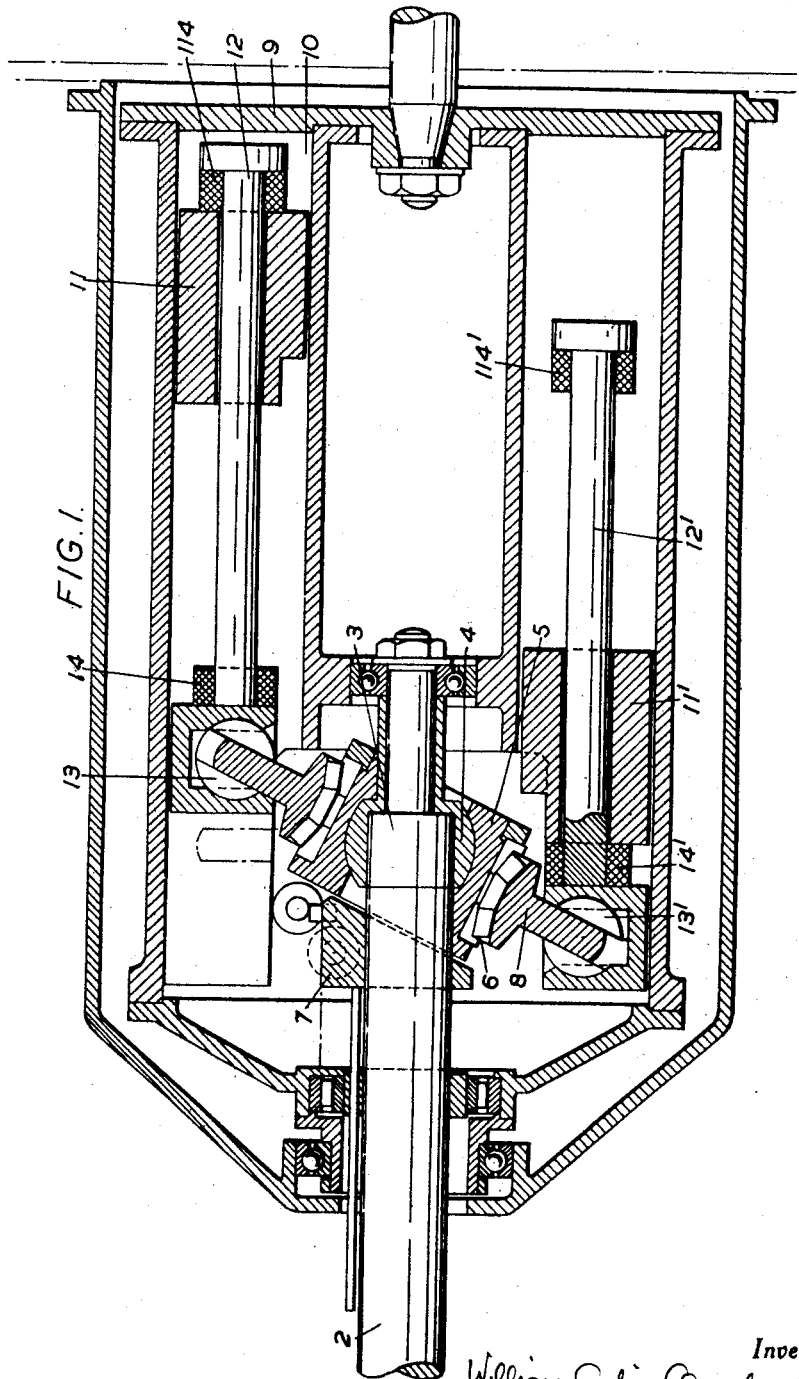
Inventor
William Adin Chamberlain
AND ERIC HAROLD GEORGE ARAM
BY

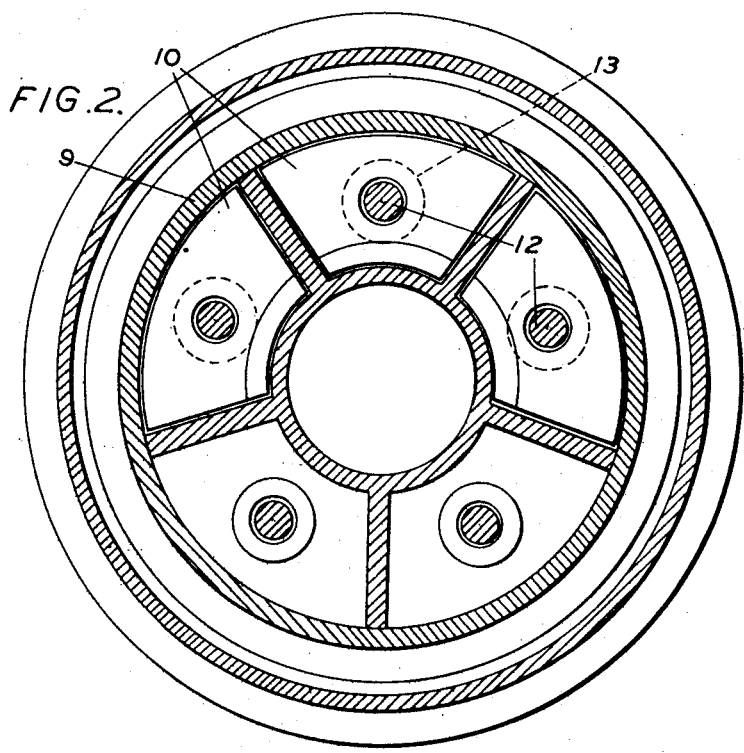
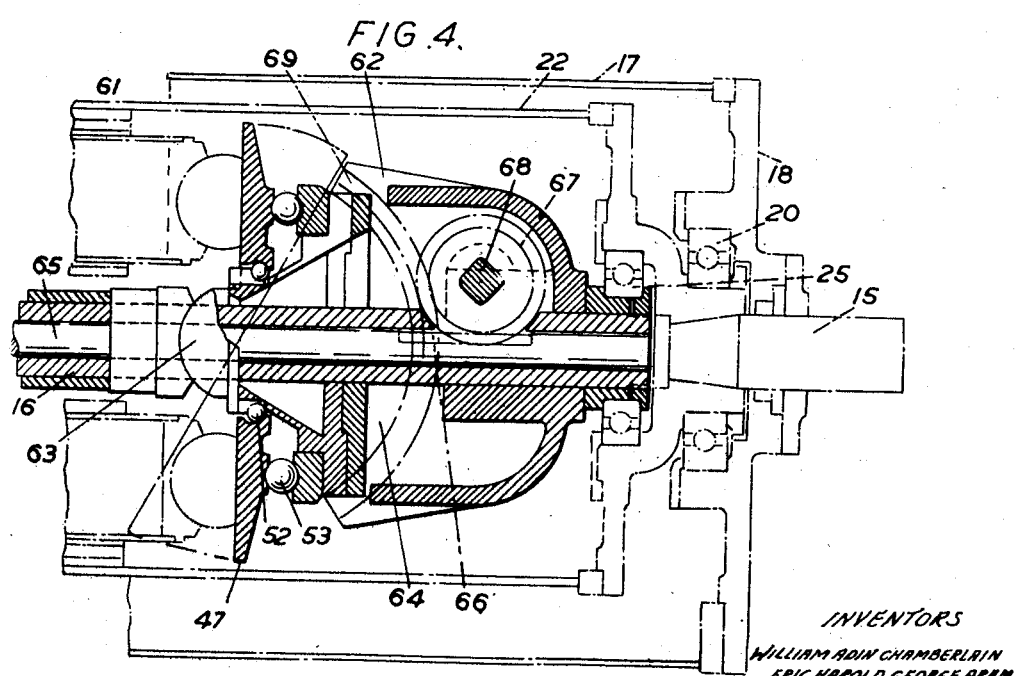

Patented July 14, 1953

2,645,130

UNITED STATES PATENT OFFICE 2,645,130

TORQUE CONVERTER

William Adin Chamberlain, Whatstandwell, near Matlock, and Eric Harold George Aram, Nuthall, England Application June 21, 1950, Serial No. 169,485
In Great Britain June 23, 1949

7 Claims. (Cl. 74—64)

This invention relates to torque converters and is particularly concerned with torque converters of the inertia type in which the centrifugal force of a weight rotated by a prime mover imposes a turning moment upon a driven shaft mounted to rotate coaxially with the driving shaft.

In known arrangements, the turning moment imparted to the driven shaft alternates in direction when the shaft runs at a lower speed than that of the driving shaft, by reason of increased resistance, such alternation occurring once per revolution of the driving shaft with reference to the driven shaft. The disadvantage exists therefore that a high speed ratchet or roller clutch has to be provided to rectify the torque direction; furthermore, the magnitude of the turning moment varies from zero to a maximum, in each direction, per revolution.

An object of the present invention is to provide an improved torque converter which provides unidirectional torque without the use of a roller clutch or similar device.

A further object of the invention is to provide substantially constant torque throughout each revolution.

A third object is to increase the torque imparted to the driven shaft inversely as its speed.

A fourth object is to provide a construction in which the speed ratio of the shafts is automatically adjusted to suit the torque resistance of the driven shaft.

A fifth object is to provide means whereby a neutral or free engine position of the converter can be obtained.

With the above objects in view the invention provides a torque converter of the type referred to wherein increased torque is obtained by storage of energy from the input shaft by a flywheel of suitable form mounted thereon, the stored energy being abstracted from the flywheel and transferred to the output shaft in impulses the number and magnitude of which vary according to the torque resistance of the output shaft.

Specifically, the invention provides a torque converter comprising a rotary driving member, a rotary driven member coaxial therewith, a plurality of inertia weights disposed around the axis, guides grouped around the axis along which said weights are movable to and fro along axially extending paths, means for rotating said weights in unison around said axis as the driving member rotates and for moving them to and fro along their guides, and means whereby the work absorbed by the weights during their acceleration is imparted to the driven member to provide unidirectional rotation of the latter. Desirably, the paths of movement of the inertia weights are rectilinear and are parallel to the axis.

The converter may have the guides connected to the driving member so as to be rotated thereby, carrying the weights with them, and may have swash-plate mechanism through which the weights are connected to the driven member and are moved to and fro along their guides upon relative rotation between the driving and driven members. There may be a lost motion connection between each weight and the swash plate mechanism whereby the abstraction of energy imparted to them during acceleration is deferred until such time as it is applied, through the swash plate mechanism, to rotate the driven member. Means may be provided for cushioning the free movement of the weights.

The swash-plate mechanism may comprise a bearing member having its axis disposed obliquely to the axis of the driving and driven members, an outer member rotatable in or about said oblique axis, and universal joints connecting the weights to the outer member. In one construction according to this invention there are two of these mechanisms with the weight guides extending between the two outer members.

Desirably, means are provided for varying the angle of swash-plate mechanism. Thus by adjusting the said angle until the general plane of the plate is normal to the axis of the driving and driven members a neutral or free engine position is obtained.

The above and other features of the invention are disclosed in the detailed description, given by way of example, of the particular embodiments illustrated in the accompanying drawings in which:

Figure 1 is a longitudinal section of a torque converter according to this invention.

Figure 2 is a cross sectional view thereof.

Figure 4 shows a modification of Figure 3.

Figure 3:
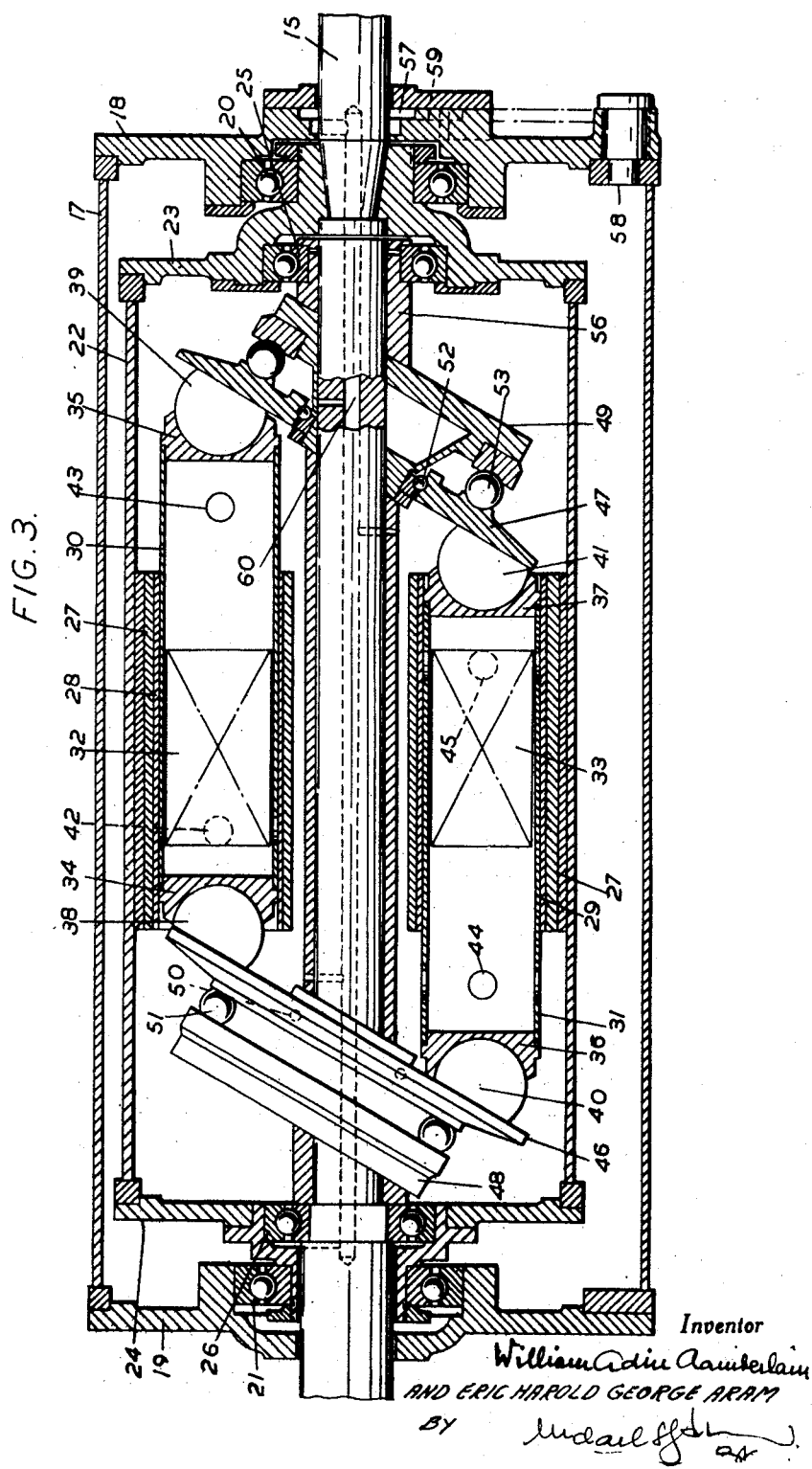
Figure 3 is a longitudinal section of a modified construction.

Referring now to Figures 1 and 2 of the drawings the torque converter illustrated is associated with an input shaft 1 and an output shaft 2. Mounted on the output shaft 2 there is a trunnion 3 comprising a part 4 fixed on the shaft and a part 5 capable of swivel movement on said part 4. The part 5 carries a combined journal and thrust bearing 6; the position of the said bearings can be adjusted from the normal to predetermined diagonal plane by means which may be of known construction such for example as a slidable cam 7 or the like. The outer race of the bearing 6 carries a rotating weight 8 which may be in the main of fly-wheel form.

Concentrically mounted on the input shaft 1 is a cage 9 forming a plurality of cells 10, 10', in which a like number of inertia weights 11, 11', are free to reciprocate axially; such axial reciprocation being caused, and limited in amplitude by, suitably formed links or arms 12, 12', which are universally jointed to the rim of the fly-wheel 8 as shown at 13, 13'. Desirably as shown the weights 11, 11' are actually mounted on the links or arms 12, 12' and buffers 14, 14', 114, 114' are also carried by said links or arms.

Referring now to Figures 3 and 4, the torque converter illustrated is associated with an input shaft 15 and an output shaft 16 coaxially disposed. A stationary outer casing 17 is closed at the ends by covers 18 and 19 which form housings for main bearings 20, 21 concentrically disposed to input and output shafts 15 and 16. A cylindrical member 22 having end flanges 23 and 24 is carried at each end by the main bearings 20, 21. The end flanges 23 and 24 are also provided with bearings 25 and 26 in which the output shaft 16 is supported. The input shaft 15 is attached to end flange 23.

A fly-wheel 27 of cylindrical form and having symmetrically disposed cylindrical holes to accommodate guide tubes 28, 29 is secured concentrically in the cylindrical member 22. Specifically, the guide tubes 28, 29 are equally spaced about the axis of rotation and have their axes parallel with it.

Reaction cells 30, 31 are slidably mounted in the tubes 28, 29 and contain cylindrical inertia weights 32, 33 which are free to slide in the reaction cells 30, 31 between end caps 34, 35, 36, 37, the outer ends of which carry hemispherically formed pads 38, 39, 40, 41 respectively.

To allow free travel of weights 32, 33, air holes 42, 43, 44, 45 are provided in reaction cells 30, 31 the end portions of the cells adjacent to end caps 34 to 37 forming dashpots to prevent violent impact between weights 32, 33 and caps 34 to 37. It will be understood that the length of the dashpots governs the distance through which retardation of weights 32, 33 takes place, and therefor governing the impulse load and consequential turning moment on a pair of discs 46, 47.

Mounted upon the output shaft 16 are diagonally inclined housings 48, 49 carrying journal and thrust bearings 50, 51, 52, 53, respectively, and the discs 46, 47 are located and supported therefrom. Distance sleeves 54, 55, 56 locate housings 48, 49 on shaft 16 and maintain a suitable working clearance between the parallel opposing faces of discs 46, 47 and reaction cells, 30, 31, end caps 34 to 37, and pads 38 to 41.

Continuous lubrication is provided by oil pump 57 of known design, in conjunction with suitable strainer, and suction and delivery oilways 58, 59, 60.

In operation of the construction shown in Figures 1 and 2 the input shaft 1 rotates the fly-wheel 8 through the above mentioned links or arms 12, 12' and universal joints 13, 13'. If the fly-wheel 8 is diagonally disposed and the output shaft 2 carrying the diagonally disposed inner race of the fly-wheel 8 is stationary or rotating at any speed less than that of the input shaft 1 it will be understood that this rotation of the fly-wheel 8 will cause axial displacement or reciprocation of the inertia weights 11, 11', through the medium of the universally jointed links 12, 12'.

In operation of the construction shown in Figures 3 and 4 the input shaft 15 rotates fly-wheel 27 together with reaction cells 30, 31, end caps 34, 37, and pads 38 to 41, said pads 38 to 41 bearing against the opposed parallel faces of annular discs 46, 47 causing rotation of same on antifriction bearings 52 and 53. It will be understood that when the output shaft 16 is stationary (or rotating at any speed less than that of the input shaft 15) the inclination of discs 46, 47 will cause axial displacement or reciprocation of the reaction cells 30, 31 together with inertia weights 32, 33.

It will also be understood that if the inertia weights 11, 11' (Figures 1 and 2) were positively fixed to the fly-wheel 8 by the links 12, 12', or the inertia weights 32, 33 (Figures 3 and 4) were fixed in the reaction cells 30, 31 and no relative motion could take place between the respective items, the work imparted to the weights during the axial acceleration would be returned to the fly-wheel 8, or discs 46, 47, during the corresponding period of axial retardation, and no increase in torque would occur. This alternation of axial thrust would occur twice per revolution, there being two periods of positive thrust alternating with negative thrust per revolution, i. e. four sectors of 90° each, two sectors being positive and two sectors being negative pressure.

The inertia weights 11, 11', 32, 33 are, however, arranged to have free axial travel through a predetermined distance, so that the energy imparted to them during the acceleration or positive period, is not abstracted until the ensuing deceleration or negative period has passed, i. e. the free travel of the weights occupies an interval of time equal to say 95° to 170° of the differential rotary motion between the input and output shafts. This free travel is dependent on the angle of the fly-wheel 8, or discs 46, 47, only and is independent of speed.

In known devices such for example as certain speedometers and revolution counters, a diagonally disposed ring is provided which is caused to rotate about its shaft axis, and the resulting unbalanced centrifugal forces act against springs or weights thereby causing axial displacement of collars and the like connected to suitable indicating mechanism. According to the present invention the unbalanced centrifugal force of the diagonally disposed fly-wheel 8, or discs 46, 47, imposes equal and opposite end thrusts on each half of the similarly diagonal inner race of the fly-wheel bearing 6, or the disc bearings 50 to 53, thereby causing rotation of the output shaft 2, or 16.

If the torque resistance of the output shaft 2, or 16, is equal to or less than, the torque capacity of the fly-wheel 8, or discs 46, 47 as above arranged, the input and output shafts will rotate at the same speed.

When the torque resistance of the output shaft 2, or 16 exceeds the torque capacity of the fly-wheel 8, or discs 46, 47, the speed of the output shaft 2 or 16 decreases, with the result that whilst the fly-wheel 8, or discs 46, 47, continues to rotate at input speed, the diagonally disposed inner race of the fly-wheel bearing 4 or the diagonal bearings of discs 46, 47, rotate at the lower output shaft speed, causing axial displacement or reciprocation of the inertia weights as previously described.

The dimensions of the inertia weights 11, 11', 32, 33 are such that the work imparted to them during acceleration, when the out-put shaft 2, or 16, is stalled and the output torque resistance therefore, at a maximum, is equal to the maximum work done by the diagonal fly-wheel 8, or discs 46, 47, i. e. when the gear ratio is 1/1, but since the inertia weights are (in this 1/1 condition) stationary in the axial sense, they will absorb no power. These proportions can be modified, if necessary, to suit particular requirements. Progressive retardation of the output shaft 2, or 16 correspondingly lowers the direct power transmitted by the diagonal fly-wheels 8, or discs 46, 47, due to its unbalanced centrifugal force, whilst the speed of oscillation of the inertia weights 11, 11', 32, 33 and therefore the work absorbed by and recovered from them, correspondingly increases to a maximum when the differential speed between input and output shafts is greatest, i. e. when the output shaft 2, or 16 is stalled.

A completely free engine position is obtained when the fly-wheel 8, or discs 46, 47, on the output shaft 2, or 16, are disposed normally to the shaft axis, and by way of example Figure 4 shows a mechanism for causing the discs 46, 47 to assume said position. More specifically, discs 46, 47 (Figure 4) together with bearings 50 to 53 and housing 48, 49, are pivotally mounted between members 61 and 62 (Figure 4) which are secured to output shaft 16, the housing 48 being provided with cylindrically machined mating surfaces 63 and 64.

The output shaft 16 is bored concentrically to contain operating rod 65, having rack teeth 66 engaging with pinion 67 supported on spindle 68, this being extended to carry two similar pinions external to member 61 mating with gear teeth 69 cut on the member 62. Axial movement of operating rod 65, relative to shaft 16, will cause oscillation of discs 46, 47 about the point of intersection of their faces with that of the shaft centre.

In certain instances according to this invention it may be desirable to dispense with the free engine position and utilise a device such for example as a clutch with reverse gear train which may be of known design for rendering the flywheel or discs operative and inoperative when required.

We claim:

1. A torque converter comprising, in combination, a driving shaft; a driven shaft mounted coaxially with said driving shaft and being spaced therefrom; fly wheel means mounted for rotation about the axis of said driving shaft and being connected to the latter so as to rotate therewith; bearing means interconnecting said fly wheel means and said driven shaft so that the latter may rotate at a different speed than the former; a plurality of elongated guide means each having opposite ends and being connected to said fly wheel means so as to rotate therewith, said plurality of guide means being equally spaced from each other and being symmetrically mounted about and parallel to the axis of said driving shaft; a plurality of weight means operatively connected to said guide means, respectively, for free reciprocating movement along said guide means between said ends thereof in a direction parallel to the axis of said driving shaft; and limiting means associated only with said ends of said guide means for limiting the free movement of said weight means only when the latter are adjacent said ends of said guide means.

2. A torque converter, comprising in combination, a driving shaft; a driven shaft mounted coaxially with said driving shaft and being spaced therefrom; fly wheel means mounted for rotation about the axis of said driving shaft and being connected to the latter so as to rotate therewith; bearing means interconnecting said fly wheel means and said driven shaft so that the latter may rotate at a different speed than the former; a plurality of elongated guide means connected to said fly wheel means so as to rotate therewith, said plurality of guide means being equally spaced from each other and being symmetrically mounted about and parallel to the axis of said driving shaft and each comprising an elongated bar connected at one end thereof to said fly wheel means; a plurality of weight means operatively connected to said guide means, respectively, for free movement along said guide means in a direction parallel to the axis of said driving shaft, said plurality of weight means each comprising an elongated member formed with an opening passing therethrough and located about one of said bars; and limiting means associated with said guide means for limiting the extent of free movement of said weight means.

3. A torque converter, comprising in combination, a driving shaft; a driven shaft mounted coaxially with said driving shaft and being spaced therefrom; fly wheel means mounted for rotation about the axis of said driving shaft and being connected to the latter so as to rotate therewith; bearing means interconnecting said fly wheel means and said driven shaft so that the latter may rotate at a different speed than the former; a plurality of elongated guide means connected to said fly wheel means so as to rotate therewith, said plurality of guide means being equally spaced from each other and being symmetrically mounted about and parallel to the axis of said driving shaft and each comprising an elongated bar connected at one end thereof to said fly wheel means; a plurality of weight means operatively connected to said guide means, respectively, for free movement along said guide means in a direction parallel to the axis of said driving shaft, said plurality of weight means each comprising an elongated member formed with an opening passing therethrough and located about one of said bars; and limiting means associated with said guide means for limiting the extent of free movement of said weight means, said limiting means comprising a pair of resilient buffer members mounted on each of said bars and being respectively located adjacent the ends thereof so that the movement of each of said weight means is limited by contact with one of said resilient buffer members.

4. A torque converter, comprising in combination, a driving shaft; a driven shaft mounted coaxially with said driving shaft and being spaced therefrom; fly wheel means mounted for rotation about the axis of said driving shaft so as to rotate therewith, said fly wheel means being inclined with respect to the axis of said driven shaft; bearing means interconnecting said fly wheel means and said driven shaft so that the latter may rotate at a different speed than the former; a plurality of elongated guide means connected to said fly wheel means so as to rotate therewith, said plurality of guide means being equally spaced from each other and being symmetrically mounted about and parallel to the axis of said driving shaft and each comprising an elongated bar connected at one end thereof to said fly wheel means; a plurality of weight means operatively connected to said guide means, respectively, for free movement along said guide means in a direction parallel to the axis of said driving shaft, said plurality of weight means each comprising an elongated member formed with an opening passing therethrough and located about one of said bars; and limiting means associated with said guide means for limiting the extent of free movement of said weight means, said limiting means comprising a pair of resilient buffer members mounted on each of said bars and being respectively located adjacent the ends thereof so that the movement of each of said weight means is limited by contact with one of said resilient buffer members.

5. A torque converter, comprising in combination, a driving shaft; a driven shaft mounted coaxially with said driving shaft and being spaced therefrom; fly wheel means mounted for rotation about the axis of said driving shaft and being connected to the latter so as to rotate therewith; bearing means interconnecting said fly wheel means and said driven shaft so that the latter may rotate at a different speed than the former; a plurality of elongated guide means connected to said fly wheel means so as to rotate therewith, said plurality of guide means being equally spaced from each other and being symmetrically mounted about the axis of said driving shaft, said plurality of guide means each comprising an elongated tubular member having opposite closed ends; a plurality of weight means operatively connected to said guide means, respectively, for free movement along said guide means in a direction parallel to the axis of driving shaft, said plurality of weight means each comprising an elongated member freely mounted in the interior of one of said tubes; and limiting means associated with said guide means for limiting the extent of free movement of said weight means, said limiting means comprising at least two openings formed in each tubular member adjacent the ends thereof, respectively, so that the air in said tubular members between said ends and said openings form dash-pots to cushion the movement of said elongated members at the ends of said tubular members while permitting free movement of said elongated members in the space between said openings in each tubular member.

6. A torque converter, comprising in combination, a driving shaft; a driven shaft mounted coaxially with said driving shaft and being spaced therefrom; fly wheel means mounted for rotation about the axis of said driving shaft and being connected to the latter so as to rotate therewith; bearing means interconnecting said fly wheel means and said driven shaft so that the latter may rotate at a different speed than the former, said bearing means being inclined with respect to the axis of said driven shaft; a plurality of guide means connected to said fly wheel means so as to rotate therewith, said plurality of guide means being equally spaced from each other and being symmetrically mounted about the axis of said driving shaft, said plurality of guide means each comprising an elongated tubular member having opposite closed ends; a plurality of weight means operatively connected to said guide means, respectively, for free movement along said guide means in a direction parallel to the axis of driving shaft, said plurality of weight means each comprising an elongated member freely mounted in the interior of one of said tubes; and limiting means associated with said guide means for limiting the extent of free movement of said weight means, said limiting means comprising at least two openings formed in each tubular member adjacent the ends thereof, respectively, so that the air in said tubular members between said ends and said openings form dash-pots to cushion the movement of said elongated members at the ends of said tubular members while permitting free movement of said elongated members in the space between said openings in each tubular member.

7. A torque converter, comprising in combination, a driving shaft; a driven shaft mounted coaxially with said driving shaft and being spaced therefrom; a fly wheel means mounted for rotation about the axis of said driving shaft and being connected to the latter so as to rotate therewith; bearing means interconnecting said fly wheel means and said driven shaft so that the latter may rotate at a different speed than the former, said bearing means being inclined with respect to the axis of said driven shaft; a plurality of guide means connected to said fly wheel means so as to rotate therewith, said plurality of guide means being equally spaced from each other and being symmetrically mounted about the axis of said driving shaft, said plurality of guide means each comprising an elongated tubular member having opposite closed ends; a plurality of weight means operatively connected to said guide means, respectively, for free movement along said guide means in a direction parallel to the axis of driving shaft, said plurality of weight means each comprising an elongated member freely mounted in the interior of one of said tubes; limiting means associated with said guide means for limiting the extent of free movement of said weight means, said limiting means comprising at least two openings formed in each tubular member adjacent the ends thereof, respectively, so that the air in said tubular members between said ends and said openings form dash-pots to cushion the movement of said elongated members at the ends of said tubular members while permitting free movement of said elongated members in the space between said openings in each tubular member; and tilting means operatively connected to said bearing means for changing the inclination of the latter with respect to the axis of said driven shaft.

WILLIAM ADIN CHAMBERLAIN.
ERIC HAROLD GEORGE ARAM.

References Cited in the file of this patent

UNITED STATES PATENTS

| Number | Name | Date |
|---|---|---|
| 1,418,953 | Martin | June 6, 1922 |
| 2,048,272 | Linthicum | July 21, 1936 |

FOREIGN PATENTS

| Number | Country | Date |
|---|---|---|
| 9,963 | Great Britain | of 1908 |